(12) United States Patent
Ruy et al.

(10) Patent No.: US 9,769,322 B2
(45) Date of Patent: Sep. 19, 2017

(54) MESSAGE SENDING DEVICE AND METHOD THEREOF

(71) Applicant: ELECTRONICS AND TELECOMMUNICATIONS RESEARCH INSTITUTE, Daejeon (KR)

(72) Inventors: Jae-Hong Ruy, Sejong (KR); Hyo-Chan Bang, Daejeon (KR); Byeong-Cheol Choi, Daejeon (KR); Hoon Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/190,257

(22) Filed: Jun. 23, 2016

(65) Prior Publication Data

US 2017/0099391 A1 Apr. 6, 2017

(30) Foreign Application Priority Data

Oct. 5, 2015 (KR) .................. 10-2015-0139762

(51) Int. Cl.
*H04M 11/00* (2006.01)
*H04M 11/06* (2006.01)
*H04L 12/10* (2006.01)
*H04L 29/08* (2006.01)
(Continued)

(52) U.S. Cl.
CPC ............. *H04M 11/06* (2013.01); *H04L 12/10* (2013.01); *H04L 67/12* (2013.01); *H04M 7/1295* (2013.01); *H04M 19/001* (2013.01); *H04M 2203/60* (2013.01)

(58) Field of Classification Search
CPC .. H04M 11/06; H04M 7/1295; H04M 19/001; H04M 2203/60; H04L 12/10; H04L 67/12
See application file for complete search history.

(56) References Cited

U.S. PATENT DOCUMENTS 5,317,545 A * 5/1994 Gray .................... H04M 19/08
368/204
5,317,620 A * 5/1994 Smith ................... H04M 11/04
340/567

(Continued)

FOREIGN PATENT DOCUMENTS

KR  10-2001-0081143 A  8/2001
KR  10-2004-0028096 A  4/2004
(Continued)

*Primary Examiner* — Stella Woo
(74) *Attorney, Agent, or Firm* — Rabin & Berdo, P.C.

(57) ABSTRACT

Disclosed herein are a telephone, a switchboard, and a method for sending a message between the telephone and the switchboard using a Dual Tone Multiple Frequency (DTMF) signal. The telephone includes a sensor interface unit for collecting sensing signals by being connected to sensors, a transmission unit for generating a message using the sensing signals, converting the message into a DTMF signal, and transmitting the DTMF signal and a telephone signal, and a power distribution unit for being supplied with power from the switchboard and distributing the power to operation units.

15 Claims, 5 Drawing Sheets

(51) Int. Cl.
*H04M 7/12* (2006.01)
*H04M 19/00* (2006.01)

(56) References Cited

U.S. PATENT DOCUMENTS

| | | | | |
|---|---|---|---|---|
| 6,453,019 | B1* | 9/2002 | Latter | H04M 3/436 |
| | | | | 379/201.01 |
| 7,649,457 | B2* | 1/2010 | Al-Jafar | G08B 21/04 |
| | | | | 340/539.14 |
| 2004/0172556 | A1 | 9/2004 | Nagao | |
| 2005/0152517 | A1* | 7/2005 | Binder | H04L 12/66 |
| | | | | 379/93.17 |
| 2008/0212568 | A1 | 9/2008 | So et al. | |
| 2010/0273467 | A1 | 10/2010 | Kim et al. | |
| 2011/0202440 | A1* | 8/2011 | Jarrah | G06Q 10/1091 |
| | | | | 705/32 |

FOREIGN PATENT DOCUMENTS

| | | |
|---|---|---|
| KR | 10-2004-0062226 A | 7/2004 |
| KR | 10-2005-0010745 A | 1/2005 |

* cited by examiner

MESSAGE SENDING DEVICE AND METHOD THEREOF

CROSS REFERENCE TO RELATED APPLICATION

This application claims the benefit of Korean Patent Application No. 10-2015-0139762, filed Oct. 5, 2015, which is hereby incorporated by reference in its entirety into this application.

BACKGROUND OF THE INVENTION

1. Technical Field

The present invention relates generally to a device and method for sending a message. More particularly, the present invention relates to a device and method for generating a message from sensing signals using a Dual Tone Multiple Frequency (DTMF) signal and transmitting the generated message to a switchboard, wherein the sensing signals are collected by sensors that are connected to an existing telephone that uses Public Switched Telephone Network (PSTN) subscriber lines and power supplied from a switchboard.

2. Description of the Related Art

In order to send a message through an existing PSTN telephone, it is necessary to use a modem capable of Analog-Digital-Analog (A-D-A) conversion in the terminal. This is disadvantageous in that a switch, which is a resource of a switchboard, must be allocated.

Another method is to send a message using a Caller ID (CID) telephone, which displays a calling number. However, this method has a limitation in providing service because the telephone can merely receive text but is not a system for sending text.

Meanwhile, currently, the Internet of Everything (IoE), based on big data, which achieves intelligence using large collections of data, has attracted a lot of attention. Here, data are collected based on sensor nodes having devices capable of communication via Wi-Fi, Zigbee, Ethernet, or the like. There is no problem in using such communication devices in most environments. However, outdoors, or in places having poor communication conditions, the collection of data requires communication devices capable of CDMA, WiBro, LTE, or the like, and these communication devices have problems in that system configuration and installation are costly and in that the provision of an additional power supply or the installation of a battery is necessary for the management thereof.

The Korean Patent Application Publication No. 10-2001-0081143, titled "The Korean letters transmission system using a numeric keypad" discloses a Hangul letter transmission system using a numeric keypad in which Hangul letters are suitably assigned to number buttons from 0 to 9 and function keys on a telephone, a Hangul message signal is directly input using a DTMF signal and converted into a Hangul letter signal, and the converted signal is transmitted to a pager, mobile phone, or other wireless device so as to send a text message. However, Korean Patent Application Publication No. 10-2001-0081143 does not mention a function in which a message is generated from data collected based on sensor nodes and is converted into an encrypted DTMF signal, and the converted signal is transmitted to a switchboard so as to acquire environment information.

SUMMARY OF THE INVENTION

Accordingly, the present invention has been made keeping in mind the above problems occurring in the conventional art, and an object of the present invention is to provide an apparatus and method for generating an environment message using an ordinary telephone, which does not have an additional power supply and may transmit a DTMF signal interpretable by an existing PSTN switchboard, converting the generated message into a DTMF signal, and transmitting the converted signal.

Other objects of the present invention will be easily understood from the following description of the embodiments.

A telephone according to an embodiment of the present invention includes a sensor interface unit for collecting sensing signals by being connected to sensors; a transmission unit for generating a message using the sensing signals, converting the message into a Dual Tone Multiple Frequency (DTMF) signal, and transmitting the DTMF signal and a telephone signal; and a power distribution unit for distributing power to operation units by being supplied with the power from a switchboard.

When the sensor interface unit is supplied with power from the power distribution unit, the sensor interface unit may supply operating power to the sensor and collect the sensing signal from the sensor.

The power distribution unit may be configured to calculate minimum power using power consumed by the sensors, a number of the sensors, and a number of operating sensors among the sensors, and to set the threshold in consideration of the minimum power.

The telephone may output a warning signal using a lamp present in the telephone if the power of the battery is equal to or less than the threshold.

The telephone may charge the battery by transmitting the telephone signal in a time slot during which a frequency of use of the telephone is lowest.

The telephone signal may be one of an off-hook signal and an on-hook signal.

Also, a switchboard according to an embodiment of the present invention includes a telephone signal detection unit for detecting a telephone signal generated by a telephone; a power supply unit for supplying power to the telephone; a DTMF/message conversion unit for receiving the telephone signal and a Dual Tone Multiple Frequency (DTMF) signal and converting the DTMF signal into a message; and a control unit for analyzing the telephone signal received from the telephone and controlling operation units of the switchboard to make the operation units perform their operations if the analyzed telephone signal is an on-hook signal.

The power supply unit may supply power to the telephone when receiving an on-hook signal from the telephone.

The power supply unit may supply power to the telephone at a preset time interval that is set in consideration of a capacity of a battery of the telephone, a number of sensors corresponding to the telephone, and power consumed by the sensors.

When the power supply unit receives a telephone signal, which is generated by the telephone because a residual capacity of the battery is equal to or less than a threshold, the power supply unit may supply power to the telephone.

The power supply unit may supply power to the telephone by receiving the telephone signal in a time slot during which a frequency of use of the telephone is lowest.

Also, a method for sending a message between a telephone and a switchboard using a Dual Tone Multiple Frequency (DTMF) signal according to an embodiment of the present invention includes transmitting, by a telephone, a telephone signal to a switchboard based on a result of comparison of a threshold with power of a battery corresponding to the telephone; detecting, by the switchboard, the telephone signal generated by the telephone and supplying, by the switchboard, power to the telephone based on the telephone signal; and generating, by the telephone, a message using sensing signal collected by sensors corresponding to the telephone, converting, by the telephone, the message into a DTMF signal, and transmitting, by the telephone, the DTMF signal to the switchboard.

The telephone signal may be one of an off-hook signal and an on-hook signal.

Supplying power to the telephone may be configured such that the switchboard supplies power to the telephone when the telephone signal is the on-hook signal.

The threshold may be set in consideration of minimum power, the minimum power being calculated using power consumed by the sensors, a number of the sensors, and a number of operating sensors among the sensors.

Supplying power to the telephone may be configured to charge the battery by transmitting the telephone signal in a time slot during which a frequency of use of the telephone is lowest.

The telephone may output a warning signal using a lamp present in the telephone if the power of the battery is equal to or less than the threshold.

Transmitting the DTMF signal to the switchboard may be configured such that in a state in which the telephone stores a message matched with each of the sensing signals, when the sensing signal is generated, the telephone searches for the message matched with the sensing signal and generates a message corresponding to the sensing signal.

Transmitting the DTMF signal to the switchboard may be configured to convert the message into a corresponding DTMF signal according to content of the message by matching the message with a DTMF signal assigned to each button of the telephone, and to further perform an encryption process for encrypting the converted DTMF signal.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context.

Hereinafter, an embodiment of the present invention will be described in detail with reference to the accompanying drawings.

Figure 1:
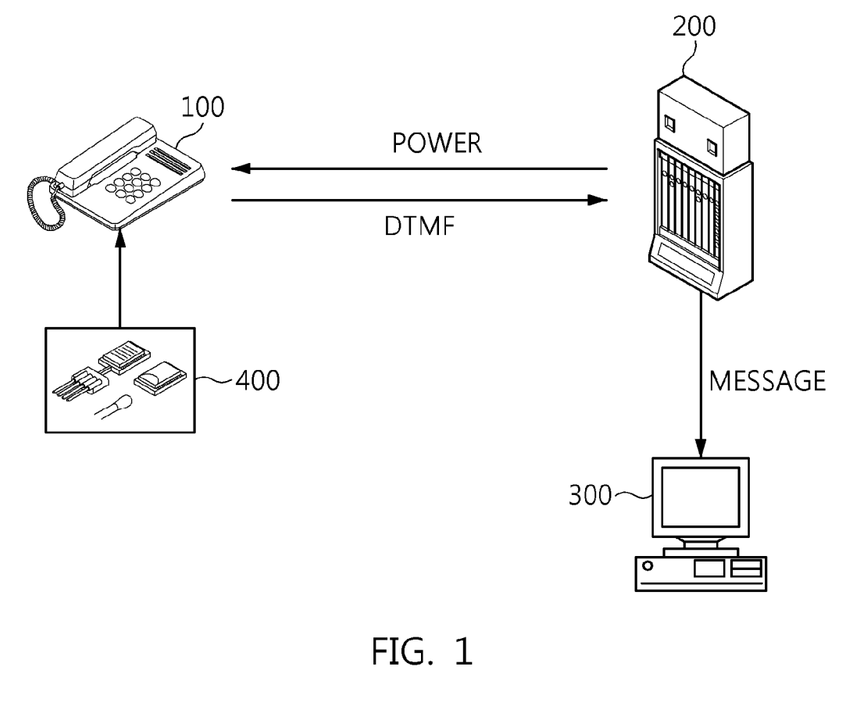
FIG. 1 is a view illustrating the configuration of a system for sending a message between a telephone and a switchboard according to an embodiment of the present invention.

FIG. 1 is a view illustrating the configuration of a system for sending a message between a telephone and a switchboard according to an embodiment of the present invention.

The system for sending a message between a telephone and a switchboard according to the present invention includes a telephone 100, a switchboard 200, a Personal Computer (PC) 300, and a sensor 400.

The telephone 100 is a subscriber's telephone connected to a Public Switched Telephone Network (PSTN). Therefore, the telephone 100 does not need a power supply, and operates using power supplied from the switchboard 200.

The telephone 100 of the present invention is connected to the sensor 400 and generates a message corresponding to environment information by receiving the environment information from the sensor 400. Then, the telephone 100 converts the generated message into a Dual Tone Multiple Frequency (DTMF) signal and transmits it to the switchboard 200.

The switchboard 200 analyzes the DTMF signal received from the telephone 100 and converts it into a corresponding message. Then, the switchboard 200 sends the converted message to the PC 300.

Here, the switchboard 200 periodically monitors a telephone signal generated by the telephone 100 and supplies power to the telephone 100 if the telephone signal corresponds to an on-hook state.

The PC 300 receives the message from the switchboard 200, and may use it or send it to another server. Here, the other server is a server for collecting and analyzing environment information.

The sensor 400 serves to collect environment information by being connected to the telephone 100.

Here, the sensor 400 may be various sensors that may sense environment information around the telephone 100, such as a temperature sensor, a humidity sensor, a light sensor, and the like.

Figure 2:
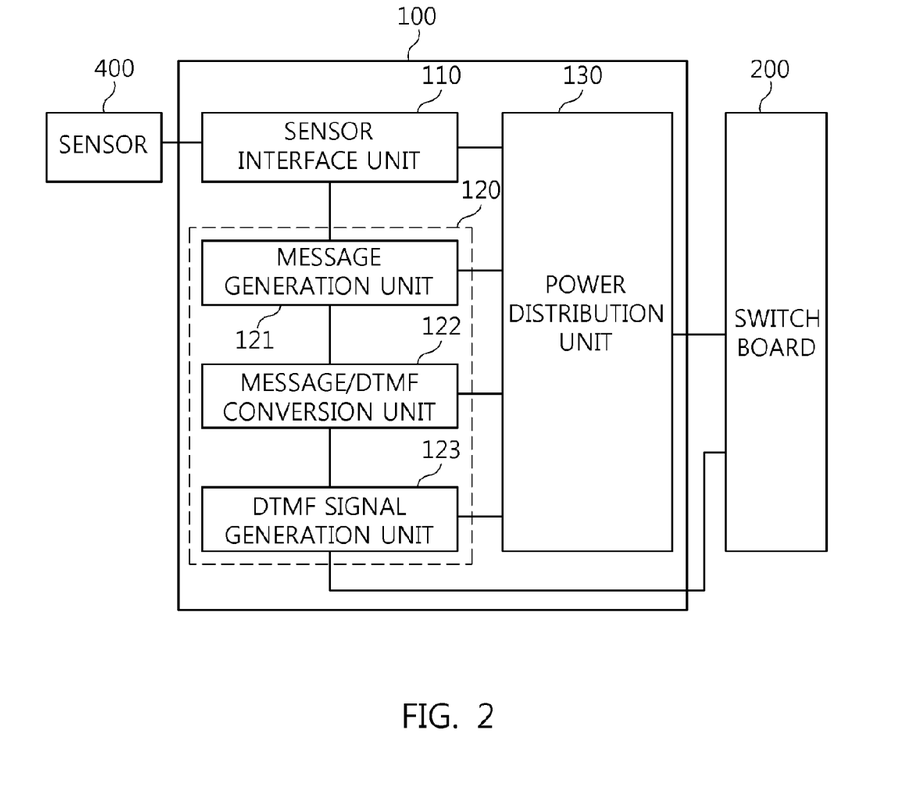
FIG. 2 is a view illustrating the configuration of a telephone according to an embodiment of the present invention.

FIG. 2 is a view illustrating the configuration of a telephone according to an embodiment of the present invention.

The telephone 100 of the present invention includes a sensor interface unit 110, a transmission unit 120, and a power distribution unit 130.

The sensor interface unit 110 is connected to the sensor 400 and collects sensing signals from the sensor 400.

Here, the sensor interface unit 110 does not always collect the sensing signals from the sensor. When the switchboard 200 supplies power to the power distribution unit 130 of the telephone 100, the sensor interface unit 110 is supplied with power from the power distribution unit 130, and then collects the sensing signal from the sensor 400 by operating the sensor 400 by supplying operating power thereto.

Here, the sensing signal means a signal generated by the sensor 400, and may vary depending on the kind of the sensor 400.

For example, if the sensor 400 is a heat sensor, a signal about a sensed temperature is generated. If the sensor 400 is a humidity sensor, a signal about sensed humidity is generated, and if it is a light sensor, a signal about the sensed intensity of light is generated.

The transmission unit 120 generates a message using the sensing signals, converts the message into a DTMF signal, and transmits the DTMF signal and a telephone signal.

Here, the transmission unit 120 may include a message generation unit 121, a message/DTMF conversion unit 122, and a DTMF signal generation unit 123.

The message generation unit 121 generates a message corresponding to the sensing signal. Here, the message generation unit 121 analyzes the sensing signal and generates a message corresponding thereto. Alternatively, in the state in which the message generation unit 121 stores a specific message matched with the sensing signal in a table, when the corresponding sensing signal is generated, it searches the table for the message matched with the corresponding sensing signal.

The message/DTMF conversion unit 122 converts the message generated by the message generation unit 121 into a DTMF signal, which can be recognized by the switchboard 200.

Here, the message/DTMF conversion unit 122 matches the consonants and vowels of the message with DTMF signals, and then converts the message into the corresponding DTMF signal according to the content of the message.

The DTMF signal generation unit 123 generates a telephone signal and the electrically converted DTMF signal.

Here, the telephone signal is a signal representing whether a telephone 100 is in an on-hook state or an off-hook state.

Here, the DTMF signal generation unit 123 may further perform a process of encrypting the DTMF signal so that only the corresponding switchboard 200 can interpret the DTMF signal.

The encryption process is described with reference to FIG. 4.

First, one number, selected from among the multiple numbers in a random number table, is set as a reference number of repetitions.

Here, the reference number of repetitions means the number of times a DTMF signal is repeated when the first character of a character string is transmitted.

Figure 4:
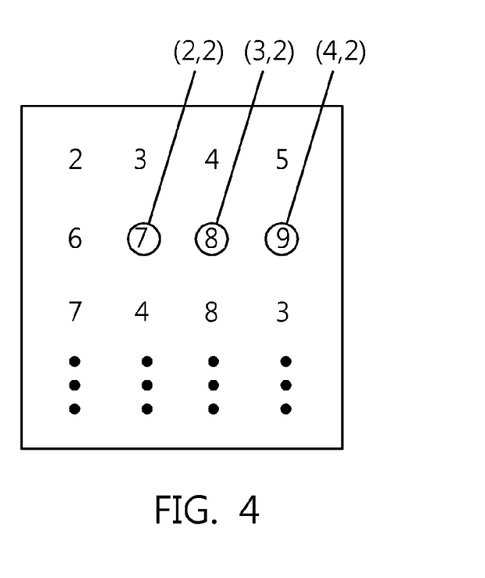
FIG. 4 is a view illustrating a random number table used for encrypting a DTMF signal in a telephone according to an embodiment of the present invention.

For example, if 7, located at (2, 2) of the table illustrated in FIG. 4, is set as the reference number of repetitions and if a character string is 'a b c d e', a DTMF signal is repeated seven times to transmit 'a'. In other words, encryption may be performed in such a way that a DTMF signal is transmitted eight times in the case of 'b', and a DTMF signal is transmitted nine times in the case of 'c'.

Here, the coordinates that represent the location of the reference number of repetitions in the random number table may be transmitted along with the DTMF signal. For example, if the number located at (2, 2) of the random number table illustrated in FIG. 4 is set as the reference number of repetitions, a signal converted from (2, 2) may be transmitted along with the DTMF signal.

In this case, the interval between DTMF signals may be set to be different in order to perform more complicated encryption.

Of course, in order for the switchboard 200 to perform decryption, the random number table corresponding to the buttons of the telephone must be stored in the switchboard.

The power distribution unit 130 is supplied with power from the switchboard 200 and distributes the power to operation units of the telephone 100.

Here, the power distribution unit 130 measures the power of a battery in the telephone 100. If the measured power is equal to or less than a threshold, the power distribution unit 130 transmits a telephone signal to the switchboard 200, and may charge the battery by being supplied with the power from the switchboard 200.

Here, the power distribution unit 130 may periodically transmit a telephone signal to the switchboard 200 and charge the battery by being supplied with the power from the switchboard 200.

Here, the threshold is a predetermined value, and there is no limitation as to the method for setting the threshold. For example, the power consumed when all the sensors operate may be calculated using the power consumed by the sensors and the number of sensors, and the calculated power may be set as the threshold.

As another example, the minimum power is calculated using the power consumed by the sensors, the average number of sensors, and the average number of operating sensors, and the calculated minimum power may be set as the threshold.

Here, a battery monitoring module in the power distribution unit 130 may measure the power of the battery.

Also, the battery monitoring module may set a specific time interval and measure the power of the battery at the specific time interval.

Here, the specific time interval may differ depending on the power consumed by the sensor and the environment in which the sensor is located.

Here, if the power of the battery is equal to or less than the threshold, the telephone 100 may output a warning signal using a lamp provided in the telephone. If the power of the battery is equal to or less than the threshold while the power of the battery is consumed by the sensor 400, there may be a problem in that the battery cannot be charged if the telephone 100 is used in spite of this situation.

Therefore, when the power of the battery is equal to or less than the threshold, a warning message is output in order to advise a user not to use the telephone.

Also, in the time slot during which the frequency of the use of the telephone is lowest, the telephone 100 may charge the battery by transmitting the telephone signal to the switchboard 200.

For example, in a time slot during which the frequency of the use of the telephone is high, even if an on-hook signal is transmitted and power is supplied from the switchboard 200, the power is consumed in order to use the telephone. Therefore, the battery may not be properly charged.

As another example, the magnitude of power transmitted from the switchboard 200 may not be high enough to operate the sensor 400. Therefore, in a time slot during which the frequency of the use of the telephone is lowest, the telephone signal (on-hook signal) is automatically transmitted to the switchboard 200, and the battery may be charged using the power transmitted from the switchboard 200.

Figure 3:
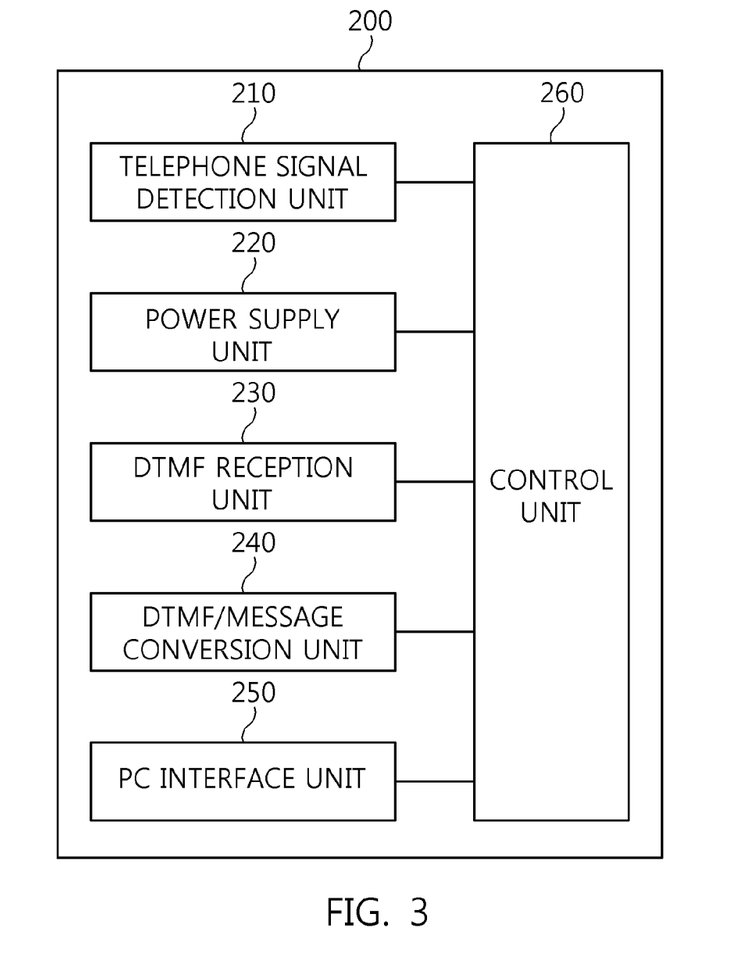
FIG. 3 is a view illustrating the configuration of a switchboard according to an embodiment of the present invention.

FIG. 3 is a view illustrating the configuration of a switchboard according to an embodiment of the present invention.

The switchboard 200 of the present invention includes a telephone signal detection unit 210, a power supply unit 220, a DTMF reception unit 230, a DTMF/message conversion unit 240, a PC interface unit 250, and a control unit 260.

The telephone signal detection unit 210 detects a telephone signal generated by the telephone 100 and determines the type of the telephone signal.

In other words, the telephone signal detection unit 210 determines whether the telephone 100 is in an on-hook state, in which the telephone is waiting for a call, or in an off-hook state, in which the line is busy.

Here, the telephone signal detection unit 210 periodically detects the telephone signal.

The power supply unit 220 supplies power to the telephone 100.

The power supply unit 220 supplies power when the telephone signal is an on-hook signal.

Here, the power supply unit 220 may supply power to the telephone at a preset time interval, which is set in consideration of the capacity of the battery of the telephone 100, the number of sensors corresponding to the telephone, and the power consumed by the sensors.

Also, when the residual capacity of the battery of the telephone 100 is equal to or less than a threshold, the telephone 100 may generate a telephone signal. In this case, the power supply unit 220 may supply the power to the telephone 100.

Also, if the telephone signal is detected by the telephone signal detection unit 210 in the time slot during which the frequency of use of the telephone is lowest, the power supply unit 220 may supply power to the telephone 100.

The DTMF reception unit 230 receives a DTMF signal from the telephone 100.

Here, if the DTMF signal received from the telephone 100 is an encrypted signal, the DTMF reception unit 230 may further perform the process of interpreting the encrypted signal.

The DTMF/message conversion unit 240 converts the DTMF signal, received from the telephone 100, into a corresponding message.

To this end, the DTMF/message conversion unit 240 receives DTMF signals corresponding to the consonants and vowels from the telephone 100 and converts each of the received signals into a consonant or a vowel corresponding thereto by analyzing the frequency of each of the received signals, whereby a complete message is generated. Alternatively, in a state in which a message corresponding to the DTMF signal received from the telephone 100 is stored in a table, when the DTMF signal is received from the telephone 100, the DTMF/message conversion unit 240 may search the table for the message corresponding to the received DTMF signal.

The PC interface unit 250 is a connection unit for connecting the switchboard 200 to the PC 300, which is outside the switchboard 200. The PC interface unit 250 transmits the message, generated through the conversion by the DTMF/message conversion unit 240, to the PC.

To this end, the PC interface unit 250 may include a communication device for communicating with the outside PC 300.

The control unit 260 analyzes the telephone signal received from the telephone 100. If the analyzed telephone signal is an on-hook signal, the control unit 260 controls the operation units of the switchboard 200 so that the operation units perform their respective operations.

Specifically, if the telephone signal is an on-hook signal, the control unit 260 controls the power supply unit 220 to make the power supply unit 220 supply power to the telephone 100 and controls the DTMF reception unit 230 and the DTMF/message conversion unit 240 in order to convert the received DTMF signal into a corresponding message. Also, the control unit 260 controls the PC interface unit 250 so that the PC interface unit 250 transmits the converted message to the outside PC 300.

Figure 5:
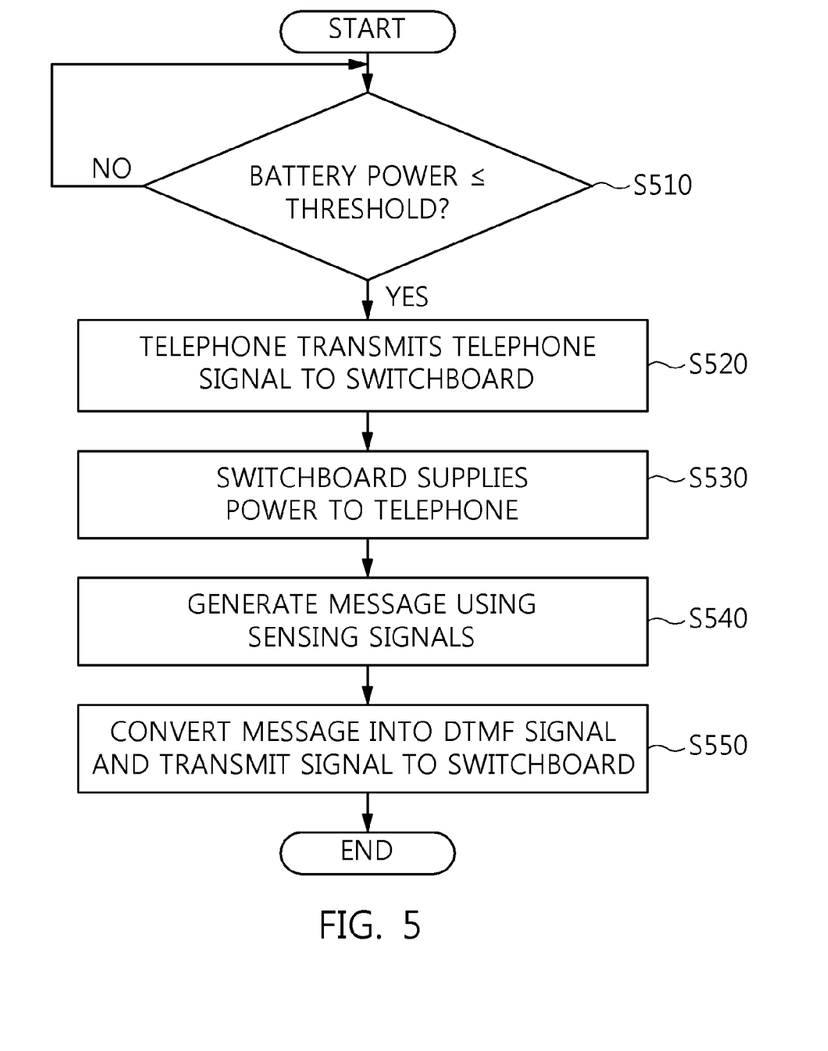
FIG. 5 is a flowchart illustrating a method for sending a message between a switchboard and a telephone using a DTMF signal according to an embodiment of the present invention.

FIG. 5 is a flowchart illustrating a method for sending a message between a switchboard and a telephone using a DTMF signal according to an embodiment of the present invention.

First, the telephone 100 compares the power of a battery of the telephone 100 with a threshold at step S510.

Here, the minimum power is calculated using power consumed by sensors, the number of sensors, and the number of operating sensors, and the threshold may be set in consideration of the minimum power.

Also, if the power of the battery is equal to or less than the threshold, the telephone 100 generates a telephone signal and transmits it to the switchboard 200 at step S520.

Here, the telephone signal may be either an on-hook signal or an off-hook signal.

However, the switchboard 200 may supply power to the telephone 100 only when the telephone signal is an on-hook signal.

At step S530, the switchboard 200 supplies power to the telephone 100.

Because the telephone 100 does not have its own power supply, it is supplied with power from the switchboard 200 in order to generate a message from a signal sensed by a sensor and to convert the generated message into a DTMF signal.

Also, at step 540, the telephone 100 generates a message using the sensing signal collected by the sensors 400 corresponding to the telephone 100.

As described above, the sensing signal is a signal generated by the sensor 400, and the sensing signal is necessary in order to generate a message using the information about the environment around the telephone 100.

For example, if the sensor 400 is a heat sensor, a signal about the sensed temperature of the surrounding environment is generated. If the sensor 400 is a humidity sensor, a signal about the sensed humidity of the surrounding environment is generated, and if it is a light sensor, a signal about the sensed brightness of the surrounding environment is generated.

Here, if the sensing signal is a signal about temperature, a message that contains information about the temperature of the surrounding environment is generated, and if the sensing signal is a signal about humidity, a message that contains information about the humidity of the surrounding environment is generated. Also, if the sensing signal is a signal about brightness, a message that contains information about the brightness of the surrounding environment is generated.

To this end, the telephone 100 has stored a message matched with the sensing signal, and searches for the corresponding message when the sensing signal is generated, or may generate a message corresponding to the sensing signal.

Also, the message is converted into a DTMF signal, and the signal is transmitted to the switchboard 200 at step S550.

When the message generated by the telephone 100 is transmitted to the switchboard 200, the present invention uses a DTMF signal rather than using a modem or other resource of the switchboard 200.

In other words, the telephone 100 of the present invention converts the generated message into a DTMF signal and transmits the DTMF signal to the switchboard 200 so that the switchboard 200 may interpret the message without installing an additional device.

Here, the telephone 100 may convert the generated message into a corresponding DTMF signal according to the content of the message by matching it with a DTMF signal assigned to each button of the telephone 100. Also, the telephone 100 may further perform the process of encrypting the converted DTMF signal.

Although not illustrated in FIG. 5, a step in which the switchboard 200 receives a DTMF signal may be performed after step S550.

Here, the switchboard 200 receives the DTMF signal from the telephone 100 through an existing PSTN telephone line.

Also, a step in which the switchboard 200 converts the DTMF signal into a message corresponding thereto may be further included. Here, if the DTMF signal received from the telephone 100 is an encrypted signal, the switchboard 200 may further perform the process of interpreting the encrypted signal.

The present invention collects sensing information using an ordinary telephone and transmits a small amount of information in the form of an analog signal in order to enable a switchboard or a PC to analyze the signal and convert it into a message, whereby installation and management costs may be reduced.

Also, because a switch, which is a switchboard resource, is not used to send or receive messages, communication service providers need not invest in additional switches, whereby infrastructure construction costs may be reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A telephone, comprising:
a sensor interface unit for collecting sensing signals by being connected to sensors;
a transmission unit for generating a message using the sensing signals, converting the message into a Dual Tone Multiple Frequency (DTMF) signal, and transmitting the DTMF signal and a telephone signal; and
a power distribution unit for distributing power to operation units by being supplied with the power from a switchboard,
wherein the power distribution unit is configured to:
measure power of a battery corresponding to the telephone; and
charge the battery by transmitting the telephone signal if the power is equal to or less than a threshold,
calculate minimum power using power consumed by the sensors, a number of the sensors, and a number of operating sensors among the sensors; and
set the threshold in consideration of the minimum power.

2. The telephone of claim 1, wherein when the sensor interface unit is supplied with power from the power distribution unit, the sensor interface unit supplies operating power to the sensors and collects the sensing signal from the sensors.

3. The telephone of claim 1, wherein the telephone outputs a warning signal using a lamp present in the telephone if the power of the battery is equal to or less than the threshold.

4. The telephone of claim 3, wherein the telephone charges the battery by transmitting the telephone signal in a time slot during which a frequency of use of the telephone is lowest.

5. The telephone of claim 4, wherein the telephone signal is an on-hook signal.

6. A switchboard, comprising:
a telephone signal detection unit for detecting a telephone signal generated by a telephone;
a power supply unit for supplying power to the telephone;
a DTMF/message conversion unit for receiving the telephone signal and a Dual Tone Multiple Frequency (DTMF) signal and converting the DTMF signal into a message; and
a control unit for analyzing the telephone signal received from the telephone and controlling operation units of the switchboard to make the operation units perform their operations if the analyzed telephone signal is an on-hook signal,
wherein the power supply unit supplies power to the telephone at a preset time interval that is set in consideration of a capacity of a battery of the telephone, a number of sensors corresponding to the telephone, and power consumed by the sensors.

7. The switchboard of claim 6, wherein the power supply unit supplies power to the telephone when receiving an on-hook signal from the telephone.

8. The switchboard of claim 6, wherein, when the power supply unit receives a telephone signal, which is generated by the telephone because a residual capacity of the battery is equal to or less than a threshold, the power supply unit supplies power to the telephone.

9. The switchboard of claim 8, wherein the power supply unit supplies power to the telephone by receiving the telephone signal in a time slot during which a frequency of use of the telephone is lowest.

10. A method for sending a message between a telephone and a switchboard using a Dual Tone Multiple Frequency (DTMF) signal, comprising:
transmitting, by a telephone, a telephone signal to a switchboard based on a result of comparison of a threshold with power of a battery corresponding to the telephone;
detecting, by the switchboard, the telephone signal generated by the telephone and supplying, by the switchboard, power to the telephone based on the telephone signal; and
generating, by the telephone, a message using sensing signal collected by sensors corresponding to the telephone, converting, by the telephone, the message into a DTMF signal, and transmitting, by the telephone, the DTMF signal to the switchboard,
wherein the telephone signal is one of an off-hook signal and an on-hook signal, and
supplying power to the telephone is configured such that the switchboard supplies power to the telephone when the telephone signal is the on-hook signal.

11. The method of claim 10, wherein the threshold is set in consideration of minimum power, the minimum power being calculated using power consumed by the sensors, a number of the sensors, and a number of operating sensors among the sensors.

12. The method of claim 11, wherein supplying power to the telephone is configured to charge the battery by transmitting the telephone signal in a time slot during which a frequency of use of the telephone is lowest.

13. The method of claim 12, wherein the telephone outputs a warning signal using a lamp present in the telephone if the power of the battery is equal to or less than the threshold.

14. The method of claim 13, wherein transmitting the DTMF signal to the switchboard is configured such that in a state in which the telephone stores a message matched with each of the sensing signals, when the sensing signal is generated, the telephone searches for the message matched with the sensing signal and generates a message corresponding to the sensing signal.

15. The method of claim 14, wherein transmitting the DTMF signal to the switchboard is configured to:
- convert the message into a corresponding DTMF signal according to content of the message by matching the message with a DTMF signal assigned to each button of the telephone; and
- further perform an encryption process for encrypting the converted DTMF signal.

* * * * *